(12) United States Patent
Lijesnic

(10) Patent No.: US 8,720,839 B2
(45) Date of Patent: May 13, 2014

(54) CONNECTOR FOR PANEL MEMBERS

(76) Inventor: Mladen Lijesnic, Long Island City, NY (US)

( * ) Notice: Subject to any disclaimer, the term of this patent is extended or adjusted under 35 U.S.C. 154(b) by 0 days.

(21) Appl. No.: 13/165,777

(22) Filed: Jun. 21, 2011

(65) Prior Publication Data

US 2011/0303813 A1 Dec. 15, 2011

Related U.S. Application Data

(63) Continuation of application No. PCT/US2011/037556, filed on May 23, 2011.

(60) Provisional application No. 61/346,965, filed on May 21, 2010.

(51) Int. Cl.
*A47F 5/00* (2006.01)
*A47H 1/10* (2006.01)

(52) U.S. Cl.
USPC .............. 248/300; 52/280; 403/169; 403/231

(58) Field of Classification Search
USPC ............... 248/300; 52/280, 63; 403/231, 170, 403/171, 169
See application file for complete search history.

(56) References Cited

U.S. PATENT DOCUMENTS

| | | | |
|---|---|---|---|
| 1,380,518 A | 6/1921 | Bellig | |
| 1,559,252 A | 10/1925 | Hartman | |
| 1,915,215 A * | 6/1933 | Carpenter | 217/69 |
| 2,067,727 A * | 1/1937 | Peister | 217/69 |
| 2,168,911 A * | 8/1939 | Meyer | 403/205 |
| 3,854,268 A | 12/1974 | Gutner | |
| 3,912,407 A * | 10/1975 | Heininger | 403/205 |
| 4,024,691 A * | 5/1977 | Hansen et al. | 52/656.9 |
| 4,198,175 A | 4/1980 | Knepp | |
| D259,083 S * | 5/1981 | Riegsecker | D8/394 |
| 4,592,672 A * | 6/1986 | Ruch, Jr. | 403/205 |
| 4,805,860 A | 2/1989 | Holmstrom | |
| 4,854,531 A * | 8/1989 | Esposito | 248/165 |
| 4,910,939 A * | 3/1990 | Cavanagh | 52/648.1 |
| 5,170,977 A * | 12/1992 | McMillan | 248/300 |
| 5,274,981 A * | 1/1994 | Commins | 52/712 |
| 5,349,800 A * | 9/1994 | Peng | 52/506.06 |
| 5,399,044 A | 3/1995 | Gilb | |
| 5,403,110 A | 4/1995 | Sammann | |

(Continued)

OTHER PUBLICATIONS

International Search Report in counterpart appln. No. PCT/US2011/037556, dated Sep. 8, 2011.

*Primary Examiner* — Amy J. Sterling
(74) *Attorney, Agent, or Firm* — Rossi, Kimms & McDowell, LLP

(57) ABSTRACT

Aspects of the invention are directed to a connector that connects a first flat member and a second flat member. The connector can include a support portion, a first arm, connected to the support portion, and defining a first arm channel. The connector can also include a second arm, connected to the support portion, and defining a second arm channel, the second arm being apart from the first arm. An opening is defined, in part, by an edge of the support portion, and edge of the first arm and an edge of the second arm. Also, the first arm channel an the second arm channel and the support portion are shaped and configured such that the first flat member can be positioned, in part, within the first arm channel, and extend through the opening, and the second flat member can be positioned, in part, in the second arm channel.

12 Claims, 6 Drawing Sheets

(56) References Cited

U.S. PATENT DOCUMENTS

| | | | |
|---|---|---|---|
| 5,528,875 A * | 6/1996 | Ziegler et al. ................... 52/702 |
| 5,676,486 A | 10/1997 | Keith |
| 6,227,507 B1 | 5/2001 | Kallio |
| 6,511,251 B2 | 1/2003 | Bowell |
| 7,155,762 B2 | 1/2007 | Harrow |
| 7,461,493 B2 | 12/2008 | Quertelet |
| D626,824 S | 11/2010 | Wood |

\* cited by examiner

CONNECTOR FOR PANEL MEMBERS

CROSS-REFERENCE TO RELATED APPLICATIONS

This application is a continuation of International Patent Application No. US2011/037556, filed on May 23, 2011, currently pending, which claims the benefit of U.S. Provisional Patent Application No. 61/346,965, filed May 21, 2010, the contents of both applications being incorporated herein by reference.

BACKGROUND OF THE INVENTION

1. Field of the Invention

Embodiments of the invention are directed to connectors for connecting panel members, and, in particular, connectors for connecting panel members to form furniture or other pieces.

2. Description of Related Art

It is a common occurrence to assemble multiple panel members, such as, for example, wooden boards or panels, into structural pieces, such as furniture. For example, it is typical for furniture companies to ship furniture pieces unassembled, with makers shipping panels, and hardware for connecting the panels, to stores. The furniture pieces are then either assembled by workers at a retail store, or brought to a home or office and assembled by the purchaser.

In such instances, the person assembling the panels and hardware into a furniture piece is not typically an expert at assembling furniture, and problems during the assembly process can occur.

One such problem is in aligning multiple panels when the panels are to be connected at right angles, such as, for example, at the corner of a bookcase. When two panel members (also referred to herein as "flat members" or "panels") are joined, the person assembling the furniture typically needs to position the two pieces at right angles, and then screw in an "L" bracket, or similar piece of hardware, into both of the panels. Because it is difficult to maintain the panels at a right angle, however, and because there is often some slack or "play" when screwing the "L" bracket into the panels, it often occurs that the sought after right angles are not achieved while assembling the furniture pieces.

In addition, a single hardware component, such as an "L" bracket, typically cannot satisfactorily facilitate the positioning and connecting of three panels positioned in three mutually perpendicular planes, such as at a top corner of a bookcase, where a vertical side panel, a horizontal shelf panel, and a back panel would be connected.

Another shortcoming of known connectors is that a single connector cannot typically be used to satisfactorily facilitate the positioning of two panels in a "T" configuration with an edge of one panel abutting a side of the other panel at a right angle, thus forming a "T" structure. Instead, such a configuration typically requires the use of two or more connectors.

Another difficulty that arises when assembling furniture is that the hardware components, such as "L" brackets, often provide much of their rigidity and support to a furniture piece by was of an attachment to a wall or other rigid structure. Thus, an "L" shelf bracket typically provides support to a shelf by way of the bracket's attachment to a wall or other rigid structure. Such a bracket does not provide much support for panel members that it is connecting, if only connected in a free-standing manner, apart from other rigid structures.

Thus, a situation exists whereby certain difficulties arise when assembling panels into furniture or other structures. Consequently, a need exists for an improved connector for positioning and connecting panels for furniture and other structures.

SUMMARY OF THE INVENTION

Embodiments of the invention are directed to these and other needs.

Embodiments of the invention are directed to a connector that includes first and second arms extending from a support portion. The arms define channels in which flat members can be supported. The arms are apart from each other, such that an opening is defined, in part, by edges of the arms and the support member. A first flat member can be positioned in the channel of the first arm and extend through the opening, with a second flat member being positioned in the second channel, with the flat members forming a "T" configuration. Embodiments of the connector can be used to support, position and connect three different flat members, with each or the flat members oriented in a plane mutually perpendicular to the planes in which the other flat members are oriented.

Embodiments are directed to a connector that connects a first flat member and a second flat member. The connector can include a support portion, a first arm, connected to the support portion, and defining a first arm channel. The connector can also include a second arm, connected to the support portion, and defining a second arm channel, the second arm being apart from the first arm. An opening is defined, in part, by an edge of the support portion, an edge of the first arm and an edge of the second arm. Also, the first arm channel and the second arm channel and the support portion are shaped and configured such that the first flat member can be positioned, in part, within the first arm channel, and pass through the opening, and the second flat member can be positioned, in part, in the second arm channel.

Other embodiments can include a connector for connecting at least a first flat member and a second flat member. The connector can include a support portion, a first arm, connected to the support portion, the first arm defining a first arm channel, and a second arm, connected to the support portion, the second arm defining a second arm channel, the second arm being apart from the first arm. The support portion can comprise a first positioning slot and a second positioning slot defined therein. An opening can be defined, in part, by an edge of the support portion, and edge of the first arm and an edge of the second arm, and the first arm channel and the second arm channel and the support portion are shaped and configured such that the first flat member can be positioned, in part, within the first arm channel, and pass through the opening, and the second flat member can be positioned, in part, in the second arm channel. The embodiment also includes a shim member, the shim member including a flat shim base, a first tab extending outward from the shim base in a direction perpendicular to the shim base, and a second tab extending outward from the shim base in a direction perpendicular to the shim base. The shim is configured such that the first tab can extend through the first positioning slot, and the second tab can extend through the second positioning slot. Also, the first tab extends into the first channel, and the second tab extends into the second channel.

Other embodiments can include a method of connecting three flat members with a single connector, the connector including a support portion, a first arm, connected to the support portion, the first arm defining a first arm channel, a second arm, connected to the support portion, the second arm defining a second arm channel, the second arm being apart from the first arm, wherein an opening is defined, in part, by an edge of the support portion, and edge of the first arm and an edge of the second arm. The method can include positioning a first flat member within the first arm channel, such that it passes through the opening, and positioning the second flat member, in part, in the second arm channel; and positioning the third flat member such that it abuts the support portion. The first flat member extends in a first plane, the second flat member extends in a second plane, and the third flat member extends in a third plane, wherein each or the first plane, second plane and third plane are mutually perpendicular to the other two of the three planes.

Thus, by way of embodiments of the invention, a connector is provided that facilitates a user supportingly positioning and connecting three different flat members, with each or the flat members oriented in a plane mutually perpendicular to the planes in which the other flat members are oriented. In addition, embodiments of the invention provide for connecting two or three flat members such that support is provided by way of the connected flat members, and the connector, and not an external structure, such as a wall. Moreover, certain embodiments facilitate a perpendicular alignment of different flat members prior to connecting the members, so that a satisfactory corner or right angle connection can be achieved.

BRIEF DESCRIPTION OF THE DRAWINGS

The invention will be more readily understood from the detailed description of exemplary embodiments presented below considered in conjunction with the attached drawings, of which.

It is to be understood that the attached drawings are for purposes of illustrating, and not limiting, the concepts of the invention.

DETAILED DESCRIPTION OF EMBODIMENTS OF THE INVENTION

Figure 1:
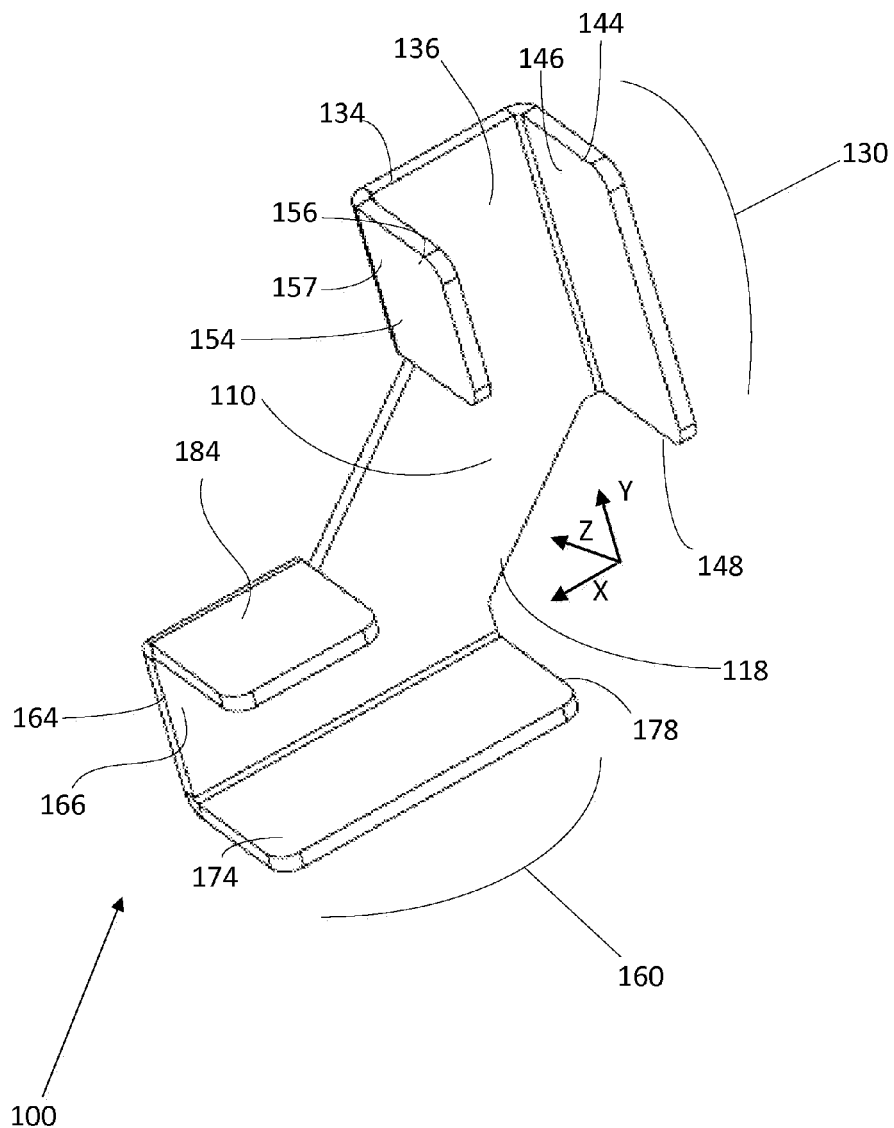
FIG. 1 is a perspective view of a connector, in accordance with embodiments of the invention.

With reference to FIG. 1, there is shown a connector 100 in accordance with embodiments of the invention. The connector 100 comprises a panel support portion 110. First arm 130 and second arm 160 each extend outwardly from support portion 110.

First arm 130 includes a base 134 connected to and extending outwardly from support portion 110. On first arm 130, outer wall 144 and inner wall 154 extend away from base 134 in opposing positions, such that base 134, outer wall 144 and inner wall 154 define a first arm channel 136. Similarly, second arm 160 includes a base 164 connected to and extending outwardly from support portion 110. On second arm 160, outer wall 174 and inner wall 184 extend away from base 164 in opposing positions, such that base 164, outer wall 174 and inner wall 184 define a second arm channel 166.

The first and second arm channels 136, 166 can be generally U-shaped such that they can each fit about and provide stability to a panel member, such as a board or panel, as is described in further detail below.

With respect to an arbitrary three-dimensional X-Y-Z axis system, support portion 110 lies in the X-Y plane. Further, base 134 of first arm 130 extends away from support portion 110 along the Y axis, while base 166 of second arm 160 extends away from support portion 110 along the X axis. Thus, first arm 130 extends in a direction perpendicular, or substantially perpendicular, to second arm 160.

First arm 130 is spaced apart from second arm 160, with outer wall 144 of first arm 130 being spaced apart from outer wall 174 of second arm 160. Edge 118 of support portion 110 is aligned diagonally in the X-Y plane, with respect to the X and Y axes, and connects to edge 148 of outer wall 144 and edge 178 of outer wall 174. In other embodiments, edge 118 can be aligned in other orientations. Edges 118, 148 and 178 define a panel opening through which a panel member can be passed or positioned, or extend, as is described in further detail below.

Figure 2:
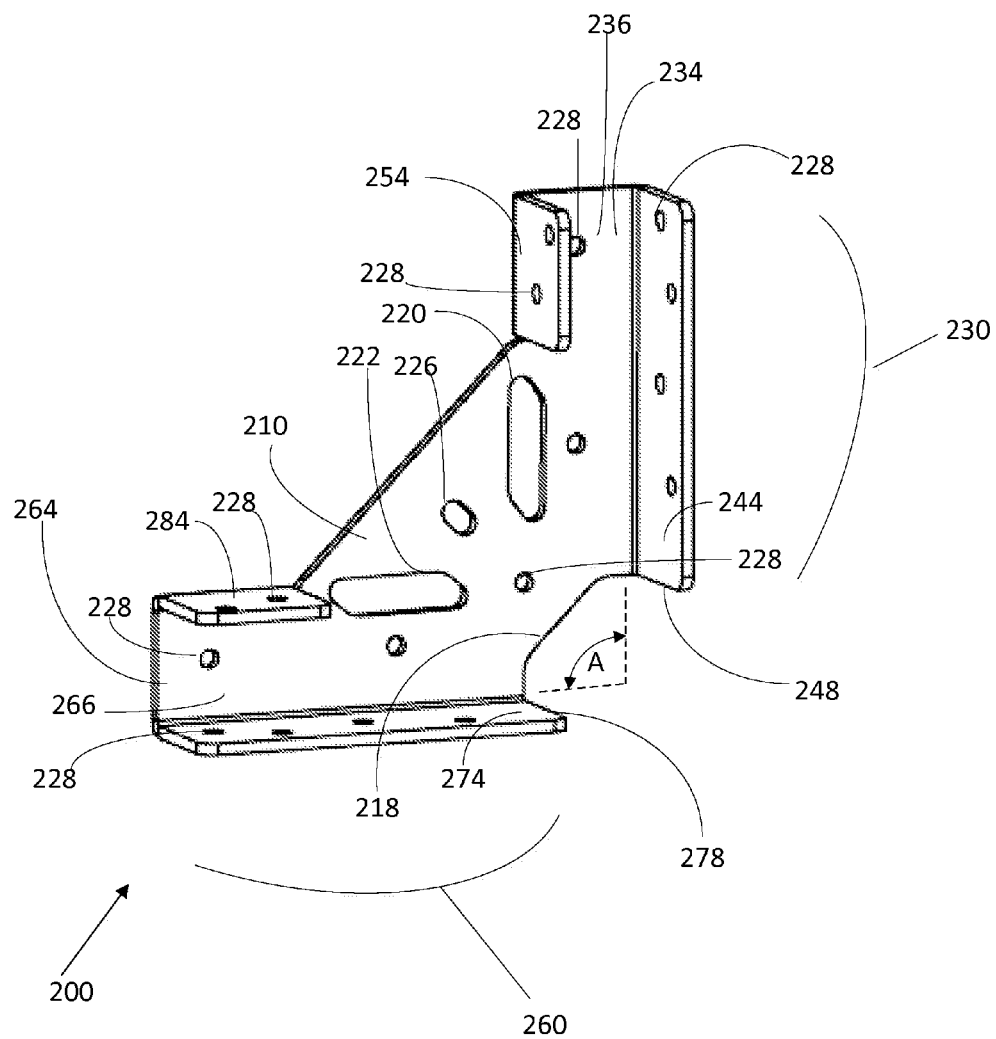
FIG. 2 is a perspective view of another connector, in accordance with embodiments of the invention.

With reference to FIG. 2, there is shown a connector 200 in accordance with embodiments of the invention. Similarly to connector 100, described above, connector 200 comprises a flat support portion 210, a first arm 230 and a second arm 260 each extending outwardly from support portion 210. Edges 218, 248 and 278 define a panel opening through which a panel member can be passed, or extend through, as is described in further detail below.

First arm 230 includes securing holes 228 defined in outer wall 244 and securing holes 228 defined in inner wall 254 and securing holes 228 defined in base 234. Similarly, second arm 260 includes securing holes 228 defined in outer wall 274, securing holes 228 defined in inner wall 284 and securing holes 228 defined in base 264. Further, support portion 210 includes one or more securing holes 228 defined therein. The securing holes 228 can be used to facilitate fastening connector 200 to panel members aligned in the first channel 236 of first arm 230, the second channel 266 of second arm 260, or adjacent to support portion 210, as is described in further detail below.

Support portion 210 also includes positioning slots 220, 222 and positioning hole 226 defined therein, which can facilitate connector 200 being used in conjunction with a shim member, as is described below with reference to FIGS. 3A and 3B.

Figure 3A:
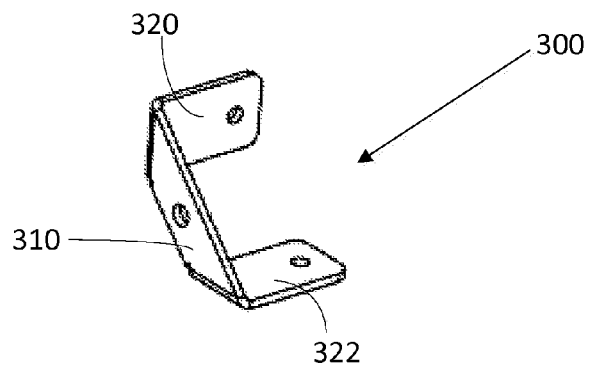
FIG. 3A is a perspective view of a shim that can be used in combination with a connector, in accordance with embodiments of the invention.

As shown in FIG. 3A, shim member 300 includes tabs 320, 322 extending outward from shim base 310. Tabs 320, 322 extend from opposite ends of, and in a direction perpendicular to, shim base 310. Tabs 320, 322 are arranged such that they extend from shim base in perpendicular orientation to each other. In other embodiments, other orientations of shim base 310, and shim tabs 320, 322 can be employed.

Figure 3B:
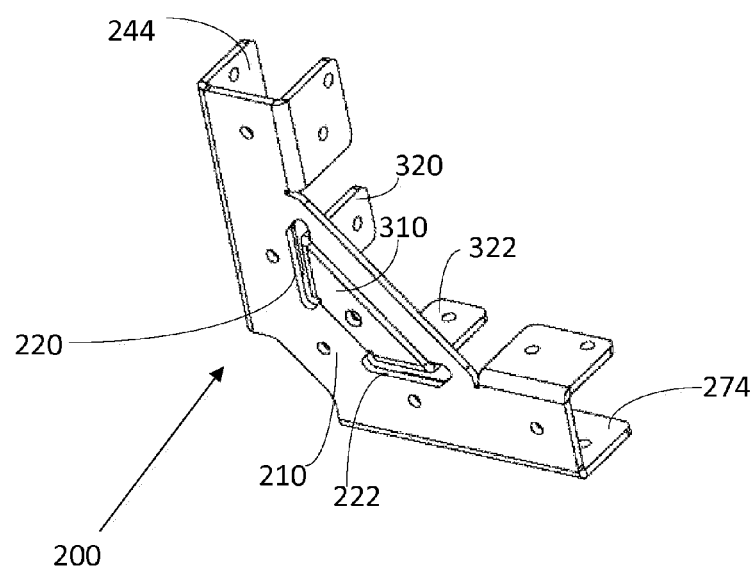
FIG. 3B is a perspective view of the connector of FIG. 2, in combination with the shim of FIG. 3A, in accordance with certain embodiments.

Shim member 300 can be used in conjunction with connector 200, as is shown in FIG. 3B. Shim member 300 can be positioned such that tab 320 of shim member 300 extends through positioning slot 220 of connector 200, and such that tab 322 of shim member 300 extends through positioning hole 222 of connector 200. Positioning slots 220, 222 can have a width greater than the thickness of tabs 320, 322, thus allowing shim member 300 to be selectively positioned such that tabs 320, 322 can be selectively positioned at predetermined respective distances from outer walls 244, 274. Such selective positioning allows the first and second channels 236, 266 to beneficially accommodate panel members of varying thicknesses. In addition, the thickness of tabs 320, 322 can be made to different dimensions to facilitate a variety of panel member thicknesses.

Figure 4A:
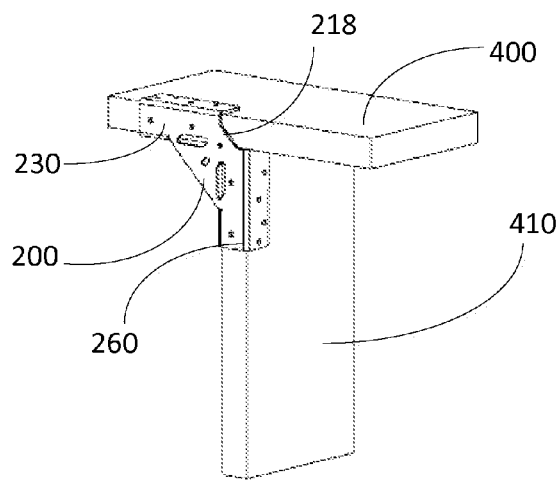
FIG. 4A is a perspective view of a connector connecting two panel members in a "T" configuration, in accordance with certain embodiments.

With reference to FIG. 4A, and with continued reference to FIGS. 1 and 2, there is shown a connector 200 facilitating the positioning and connecting of a horizontal panel member 400 and a vertical panel member 410 in a "T" formation. A portion of an edge of horizontally positioned panel member 400 is positioned within the channel 236 of first arm 230, and a portion of an edge of vertically positioned panel member 410 is positioned within the channel 266 of second arm 260. A "T" formation can also be formed by reversing the relative positions of the panel members in the connector arms. Beneficially, the panel member 400 can pass through the panel opening defined in part by edges 218, 248 and 278. Thus, by first and second arms 230 and 260 being spaced apart, panel member 400 can pass or extend through the panel opening formed in part by edges 218, 248 and 278, with an end of panel member 410 abutting the panel member 400, and forming the shown "T" structure. Also, a panel positioned in either channel can extend through the opening.

Figure 4B:
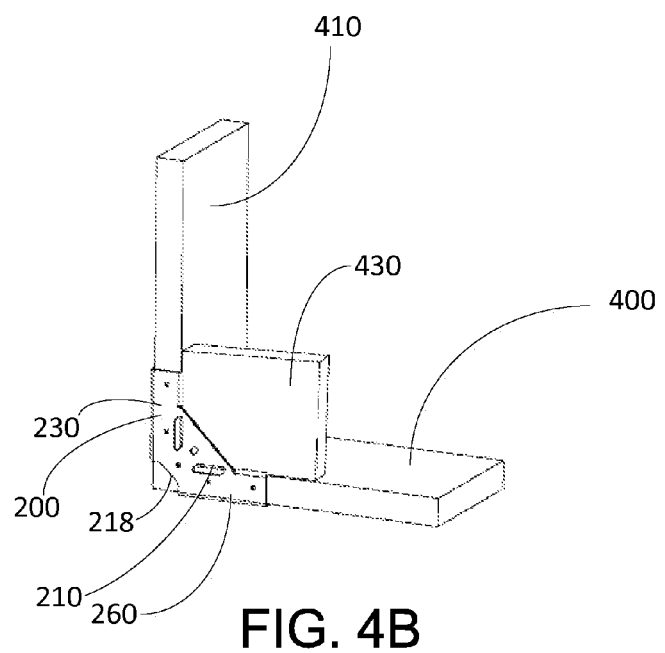
FIG. 4B is a perspective view of a connector connecting three panel members, in accordance with certain embodiments.

With reference to FIG. 4B, and with continued reference to FIGS. 1 and 2, there is shown a connector 200 facilitating the positioning and connecting of a horizontal panel member 400 and a first vertically oriented panel member 410 in an "L" configuration. In addition, a second vertically oriented panel member 430 is also connected by way of connector 200, with the three connected panel members forming a "box" configuration. With reference to the X-Y-Z axis shown in FIG. 1, and which also applies to FIG. 2, a single connector 200 can be used to connect and stabilize a first panel member 410 positioned in the Y-Z plane, a second panel member 400 positioned in the X-Z plane, and a third panel member 430 positioned in the X-Y plane. Thus, a single connector 200 can be used to secure three different panel members, with each panel member being positioned in a different plane, with each plane being perpendicular to the other two planes. Such an orientation of the planes is also referred to herein as the planes being "mutually perpendicular."

Figure 4C:
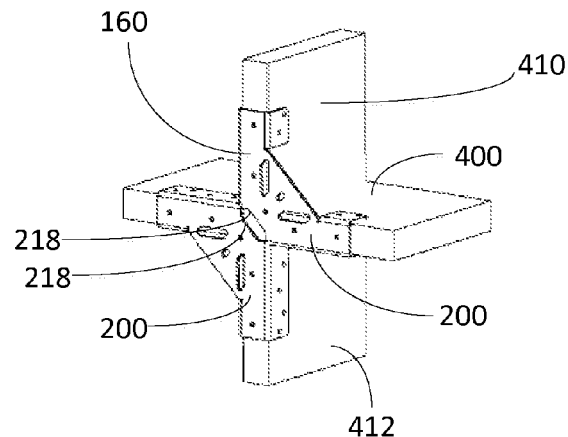
FIG. 4C is a perspective view of two connectors, connecting panel members in an "X" configuration, in accordance with certain embodiments.

With reference to FIG. 4C, and with continued reference to FIGS. 1 and 2, there is shown two connectors 200 used to position a horizontally oriented panel member 400, first vertically oriented panel member 410 and second vertically oriented panel member 412 in an "X" configuration. Due to the above-described diagonal orientation of edge 218 with respect to first arm 230 and second arm 260, two connectors 200 can be positioned with their respective edges 218 adjacent, in an interlocking fashion, allowing horizontally oriented panel member 400 to pass through the panel openings of both of the connectors 200, and allowing an end of each of vertically oriented panel members 410 and 412 to abut a side of panel member 400.

Due to the above-described features of embodiments of connector 200 (and connector 100), connector 200 can facilitate the assembly of structures, such as, for example, furniture pieces, by a non-expert assembler, such as in the case of furniture that is purchased in parts and then assembled by the purchaser. The first and second channels defined in the first and second arms allows for multiple panel members to be partially and supportingly held in place at right angles and then screwed into place. Thus, embodiments of the connector make it easy for a user to position multiple members to have perpendicular or "true" angles (or corners) between the respective panel members. In the embodiment shown in FIG. 4B, a user would be able to supportingly position three mutually perpendicular panel members with connector 200, and maintain a mutually perpendicular relationship between the three panel members 400, 410, 430 to allow for screwing or otherwise securing the panel members 400, 410, 430 to the connector 200. In the embodiment shown in FIG. 4B, the third panel member 430 could be the back of a furniture piece, such as a bookcase. After the panel members 400, 410, 430 are secured to the connector 200 by screws or other fasteners, the panel members 400, 410, 430 are supported by the connector 200 without reliance on an external rigid structure, such as a wall or ceiling.

Figure 5A:
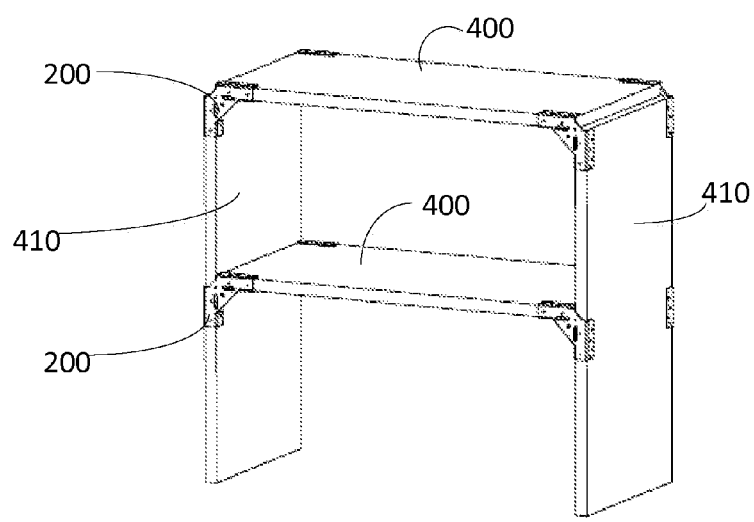
FIGS. 5A-5C are perspective views of furniture pieces constructed from a combination of connectors, and panel members, in accordance with certain embodiments.
Figure 5B:
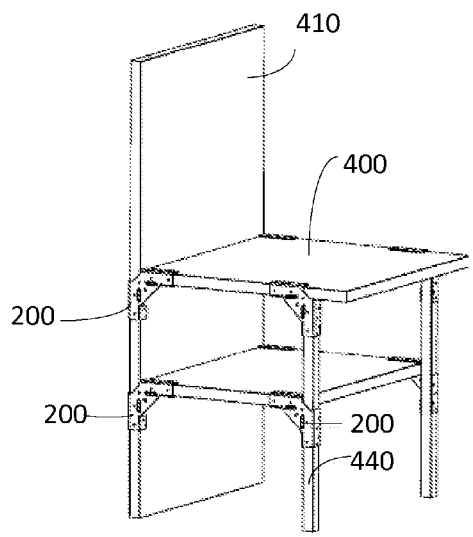
Figure 5C:
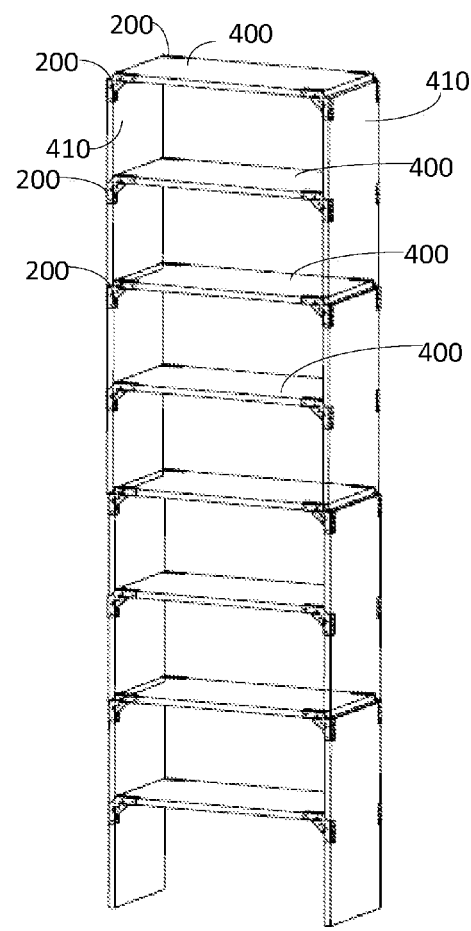

With reference to FIGS. 5A-5C, there is shown various furniture piece configurations including multiple connectors 200 (or 100). FIG. 5A shows a desk formed with horizontally oriented panel members 400, vertically oriented panel members 410 and connectors 200. In FIG. 5B is illustrated a chair-like structure that is a combination of a vertically oriented panel member 410, horizontally oriented panel members 400, multiple connectors 200 and square rods 440. In the embodiment of FIG. 5B, portions of square rods are placed within the channels 266 defined in the second arms 260 (see FIG. 2). Thus, embodiments of the connector 200 (and connector 100) can also be used to connect panel members with square rods.

With reference to FIG. 5C, there is shown a furniture piece configured as a book case that makes use of a combination of horizontally oriented panel members 400, vertically oriented panel members 410 and connectors 200 (or connectors 100).

As referred to herein, the panel members can be wood panels or boards, solid or hollow, natural wood, or particle board or plywood, such as ¾ inch plywood. Embodiments of the connector of the present application can also be used with panel members made from plastic, metal and/or glass and combinations thereof. While the panel members are typically flat and straight, in certain embodiments, the panel members can be curved or have other shapes. Embodiments of the connector can also be used to supportingly connect rectangular metal tubes or other similar tubes made of other materials known in the art.

Embodiments of the present connector can be used to supportingly join and connect panel members to make furniture pieces such as, for example, desks, bookcases, chairs, cabinets and wine racks. Further, embodiments of the present connector can be used to supportingly join and connect panel members for use with partitions and other flexible office space systems such as to form cubicles in a modern flexible work space. In addition, it is contemplated that embodiments of the present connector can be used to form other structures, such as sheds, tents and canopy systems, as well as those related to toys and games, including erector sets and other modular building toys.

Embodiments of the present connector can be stamped, laser cut or water jet cut from a single piece of metal such as, for example, 14 gauge steel. Other thicknesses can be used as a matter of design choice. Alternately, the connector can be cast in metal, or injection molded from metal or plastic. The formed single piece can be bent via progressive dies or manually bent or bent via a bending die to form the connector as configured. In certain embodiments, the finish can be natural, or could be varied as a matter of design choice. Embodiments of the invention can include methods of making the connectors as described above. In addition, embodiments of the invention can include assembling, building or forming furniture pieces or other structures with the connectors as described herein.

Embodiments of the inventive connector can include more or fewer positioning holes, positioning slots and securing holes than shown. The securing holes can be screw holes for standard wood screws, holes for zip type screws, threaded holes, or synched in holes. The holes facilitate securing the panel members to the connector once the panel members are stabilized by the connector.

Because screws are used, and because, in embodiments of the invention, the screws are externally accessible after assembly, the screws can be accessed and removed, thus allowing the panel members and screws to be reconfigured and re-used in certain circumstances.

With continued reference to FIGS. 2 and 1, the first and second channels 236, 266 (136, 166) defined in the first and second arms 230, 260 (130, 160) of embodiments of the invention can be dimensioned so as to accommodate ¾ inch plywood, or other panel member dimensions as required. In addition, while the channels 236, 266 (136, 166) are shown defining a general U-shape or C-shape, in certain embodiments, the channels 236, 266 (136, 166) can have other shapes to accommodate different shape panel members. In addition, the terms "U-shaped" or "C-shaped," as used herein, are intended to include shapes having sharp corners, as is depicted in FIGS. 1 and 2. In some embodiments, rounded or smoothed corners can be employed. In addition, while walls 244, 254 are shown extending perpendicularly up from arm bases 234, 264, in certain embodiments, the walls 244, 254 can extend out from respective bases 234, 264 at other angles.

In addition, with continued reference to FIG. 2, while first arm 230 is oriented perpendicular to the second arm 260, that is, angle A is at 90 degrees, in certain embodiments, angle A can be larger or smaller than 90 degrees.

Reference has been made above in detail to specific embodiments of the invention including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments can be combined, as would be understood by one of skill in the art. In addition, well known features may not have been described in detail to avoid unnecessarily obscuring the invention.

It is to be understood that the exemplary embodiments are merely illustrative of the invention and that many variations of the above-described embodiments can be devised by one skilled in the art without departing from the scope of the invention. It is therefore intended that all such variations be included within the scope of the following claims and their equivalents.

What is claimed is:

1. A connector for connecting at least a first flat member and a second flat member, comprising:
   a support portion;
   a first arm, connected to the support portion, the first arm defining a first arm channel;
   a second arm, connected to the support portion, the second arm defining a second arm channel, the second arm being apart from the first arm;
   the first arm including a first base, and a first inner wall and a first outer wall, extending out from the first base, the first inner wall being shorter than the first outer wall, the first base, first inner wall and first outer wall defining the first arm channel;
   the second arm including a second base, and a second inner wall and a second outer wall, extending out from the second base, the second inner wall being shorter than the second outer wall, the second base, second inner wall and second outer wall defining the second arm channel;
   the support portion being directly connected to the first base of the first arm, and being aligned in parallel with the first base of the first arm;
   the support portion being directly connected to the second base of the second arm, and being aligned in parallel with the second base of the second arm;
   the first outer wall having a first proximal edge and a first distal edge;
   the second outer wall having a second proximal edge and a second distal edge;
   the first outer wall having a first wall length extending from the first distal edge to the first proximal edge;
   the second outer wall having a second wall length extending from the second distal edge to the second proximal edge;
   wherein an opening is defined, in part, by the first proximal edge and the second proximal edge;
   wherein the first arm channel and the second arm channel are shaped and configured such that the first flat member can be disposed, in part, within the first arm channel, and extend through the opening, and past the second outer wall, and the second flat member can be disposed, in part, in the second arm channel;
   wherein the first inner wall of the first arm channel is configured such that it contacts a side of the first flat member; and
   wherein the second proximal edge of the second wall is configured such that it contacts the side of the first flat member.

2. The connector of claim 1, wherein the first flat member and the second flat member are arranged in a T configuration.

3. The connector of claim 1, wherein the support portion is shaped and configured such that a third flat member can be positioned as to abut the support portion.

4. The connector of claim 1, wherein the edge of the support portion extends diagonally from the first arm to the second arm.

5. The connector of claim 1, wherein the first arm extends outward in a first direction, and the second arm extends outward in a direction perpendicular to the first arm.

6. The connector of claim 1, wherein the support portion is shaped and configured such that a third flat member can be positioned as to abut the support portion;
   wherein the first flat member extends in a first plane, the second flat member extends in a second plane, and the third flat member extends in a third plane, wherein each or the first plane, second plane and third plane are mutually perpendicular to the other two of the three planes.

7. The connector of claim 1, wherein the first arm channel and the second arm channel are substantially U-shaped.

8. The connector of claim 1,
the support portion comprising a plurality of positioning slots defined therein, wherein the positioning slots are shaped and configured to receive the tabs of a shim.

9. The connector of claim 1,
the support portion comprising a plurality of positioning slots defined therein;
wherein the positioning slots are shaped and configured to receive the tabs of a shim member; and
wherein the positioning slots have a width that is greater than the thickness of the tabs of the shim member, such that the shim member can be selectively positioned within the positioning slots.

10. A connector comprising:
a support portion;
a first arm, connected to the support portion, the first arm defining a first arm channel;
a second arm, connected to the support portion, the second arm defining a second arm channel,
the second arm being apart from the first arm;
the first arm including a first base, and a first inner wall and a first outer wall, extending out from the first base, the first inner wall being shorter than the first outer wall, the first base, first inner wall and first outer wall defining the first arm channel;
the second arm including a second base, and a second inner wall and a second outer wall, extending out from the second base, the second inner wall being shorter than the second outer wall, the second base, second inner wall and second outer wall defining the second arm channel;
the support portion being directly connected to the first base of the first arm, and being aligned in parallel with the first base of the first arm;
the support portion being directly connected to the second base of the second arm, and being aligned in parallel with the second base of the second arm;
the first outer wall having a first proximal edge and a first distal edge;
the second outer wall having a second proximal edge and a second distal edge;
the first outer wall having a first wall length extending from the first distal edge to the first proximal edge;
the second outer wall having a second wall length extending from the second distal edge to the second proximal edge;
wherein an edge of the support portion extends diagonally from the first arm to the second arm;
wherein an opening is defined, in part, by the edge of the support portion, the first proximal edge and the second proximal edge; and
wherein the support portion is shaped and configured to maintain the first arm in an orientation perpendicular to the second arm.

11. The connector of claim 1, wherein the first arm channel is shaped and configured to receive the first flat member as the first flat member is moved in a direction perpendicular to the first axis, such that the first flat member is disposed, in part, in the first arm channel, and the second arm channel is shaped and configured to receive the second flat member as the second flat member is moved in a direction perpendicular to the second axis, such that the second flat member is disposed, in part, in the second arm channel.

12. The connector of claim 11, wherein the first inner wall and the first outer wall each have a free edge opposite the first base, and the second inner wall and the second outer wall each have a free edge opposite the second base; and
wherein the first inner wall and the first outer wall are shaped and configured to allow the first member, as it is moved in the perpendicular direction, to pass between their respective free edges, and the second inner wall and the second inner wall are shaped and configured to allow the second member, as it is moved in the perpendicular direction, to pass between their respective free edges.

\* \* \* \* \*